US 8,033,461 B2

(12) United States Patent  (10) Patent No.: US 8,033,461 B2
Barron et al.  (45) Date of Patent: Oct. 11, 2011

(54) ITEM CHECKOUT DEVICE AND WEIGH PLATE WITH IMPROVED ELECTROMAGNETIC FIELD PERFORMANCE

(75) Inventors: Peter B. Barron, Tucker, GA (US); David L. Gregerson, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 462 days.

(21) Appl. No.: 12/117,300

(22) Filed: May 8, 2008

(65) Prior Publication Data
US 2009/0321518 A1 Dec. 31, 2009

(51) Int. Cl.
*G06K 15/00* (2006.01)
(52) U.S. Cl. .............................. 235/383; 235/375; 705/5
(58) Field of Classification Search .................. 235/375, 235/383, 462; 340/572
See application file for complete search history.

(56) References Cited

U.S. PATENT DOCUMENTS

| 4,656,344 | A  | * | 4/1987 | Mergenthaler et al. | ..... 177/25.15 |
| 5,834,708 | A  | * | 11/1998 | Svetal et al. | .................. 177/180 |
| 6,457,644 | B1 | * | 10/2002 | Collins et al. | ............ 235/462.14 |
| 6,857,567 | B2 | * | 2/2005 | Latimer et al. | ................ 235/383 |
| 2003/0150653 | A1 | * | 8/2003 | Montagnino et al. | ......... 177/262 |
| 2004/0189472 | A1 | * | 9/2004 | Acosta et al. | .............. 340/572.3 |
| 2006/0065721 | A1 | * | 3/2006 | Addison et al. | ............... 235/383 |
| 2006/0266824 | A1 | * | 11/2006 | Hassenbuerger | ............. 235/383 |
| 2007/0080228 | A1 | * | 4/2007 | Knowles et al. | ......... 235/462.42 |

* cited by examiner

*Primary Examiner* — Michael G Lee
*Assistant Examiner* — Matthew Mikels
(74) *Attorney, Agent, or Firm* — Paul W. Martin

(57) ABSTRACT

A item checkout device and weigh plate with improved electromagnetic field performance. The item checkout device includes a housing, an electromagnetic field generator in the housing, a barcode reader in the housing, a scale assembly in the housing, and the weigh plate. The weigh plate is supported by the scale assembly and includes a non-metallic planar section located over the electromagnetic field generator and having a top surface resistant to damage and substantially transparent to an electromagnetic field from the electromagnetic field generator, and a window coplanar with the non-metallic planar section and located over the barcode reader.

19 Claims, 4 Drawing Sheets

ITEM CHECKOUT DEVICE AND WEIGH PLATE WITH IMPROVED ELECTROMAGNETIC FIELD PERFORMANCE

BACKGROUND

Item checkout devices suited for checkout counter operation typically include a barcode reader and a scale assembly. A weigh plate rests upon the scale assembly. Such item checkout devices may also be outfitted with an electronic article surveillance (EAS) mounted beneath the weigh plate for detecting and deactivating security tags on products and/or a radio frequency identification (RFID) system for reading RFID tags on products.

There is a mindset in the barcode scanner industry to use metal for surfaces that take the most abuse. Therefore, weigh plates are made of metal, such as aluminum, steel, or stainless steel. Some may include a metal top skin on a substrate. The use of metal provides rigidity, and enhances cleanliness at the checkout environment. However, the use of metal, particularly stainless steel, is expensive.

Metal also acts as a shield between an EAS system and security tags on scanned products, and between an RFID system and RFID tags on scanned products.

To overcome shielding, EAS system providers must increase deactivation field strengths to levels that raise concerns over operator safety.

It would be desirable to provide an improved weigh plate that addresses these concerns.

SUMMARY

An item checkout device and weigh plate with improved electromagnetic field performance is provided.

The item checkout device includes a housing, an electromagnetic field generator in the housing, a barcode reader in the housing, a scale assembly in the housing, and the weigh plate. The weigh plate is supported by the scale assembly and includes a non-metallic planar section located over the electromagnetic field generator and having a top surface resistant to damage and substantially transparent to an electromagnetic field from the electromagnetic field generator, and a window coplanar with the non-metallic planar section and located over the barcode reader.

DETAILED DESCRIPTION

Figure 1:
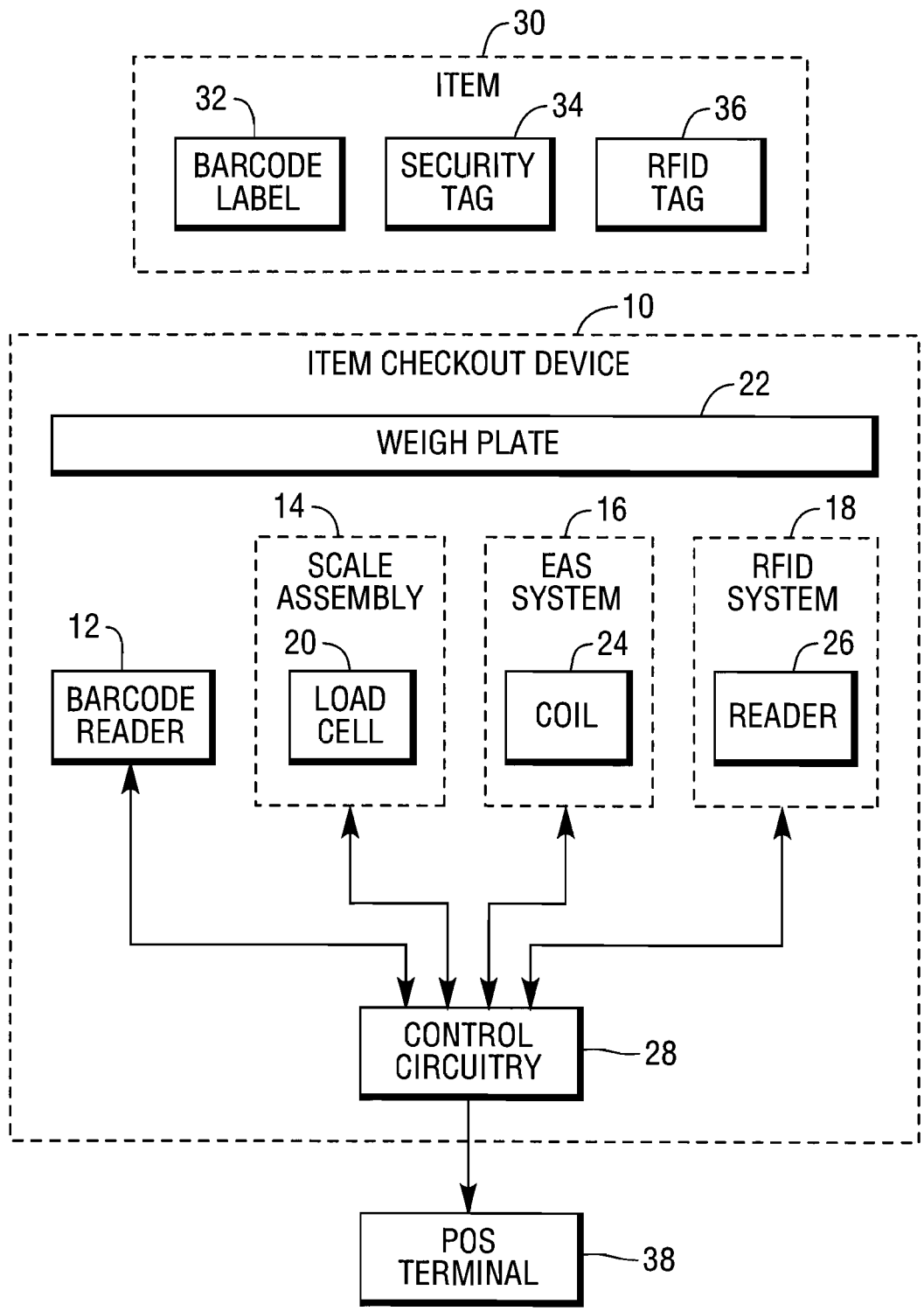
FIG. 1 is a block diagram of an example item checkout device.

With reference to FIG. 1, item checkout device 10 includes barcode reader 12, scale assembly 14, electronic article surveillance (EAS) system 16, and radio frequency identification (RFID) system 18.

Barcode reader 12 may include any type of technology for reading barcode 32 on item 30, including but not limited to laser-based barcode reading technologies, image-based barcode reading technologies, and combinations of both laser and image-based barcode reading technologies.

Scale assembly measures and records weights of produce items. Scale assembly 14 includes one or more load cells 20 and weigh plate 22. Load cell 20 may be mounted at a low point in item checkout device 10 and a conventional weigh plate support bar (e.g., an "H" bar) may be mounted on load cell 20. Alternatively, load cell 20 may include a planar beam load cell, such as the planar beam load cells manufactured by Flintec, Inc. A plurality of planar beam load cells may be mounted above barcode reader 12.

EAS system 16 detects and deactivates security tags 34 on items 30. EAS system 16 may be located below weigh plate 22. EAS system 16 may be manufactured by companies such as Sensormatic, Inc., or Checkpoint, Inc. As such, security tags 34 may be of magnetic or fuse types.

EAS system 16 may include one or more coils 24 mounted below weigh plate 22. Coil 24 wirelessly senses the presence of security tag 34 and deactivates security tag 34. Depending upon type of security tag 34, coil 24 either produces a demagnetizing field or induces a fuse destroying current.

RFID system 18 includes reader 26 for wirelessly reading RFID tag 36 on item 30. RFID system 18 may be located below weigh plate 22.

Item checkout device 10 additionally includes control circuitry 28 which controls operation of item checkout device 10, including operation of barcode reader 12, scale assembly 14, EAS system 16, and RFID system 18. Control circuitry 28 may include a single control circuitry or several control circuits associated with barcode reader 12, scale assembly 14, EAS system 16, and RFID system 18.

Control circuitry 28 decodes information encoded in barcode label 32, and sends the information in barcode label 32 and the information in RFID tag 36 to point-of-sale (POS) terminal 38.

Variations of checkout device 10 are envisioned. For example, electromagnetic field generators may or may not be installed within item checkout device. For example, RFID system 18 may be present, but not EAS system 16, or vice versa. Correspondingly, item 30 may not always include security tag 34 or RFID tag 36 or both.

Figure 2:
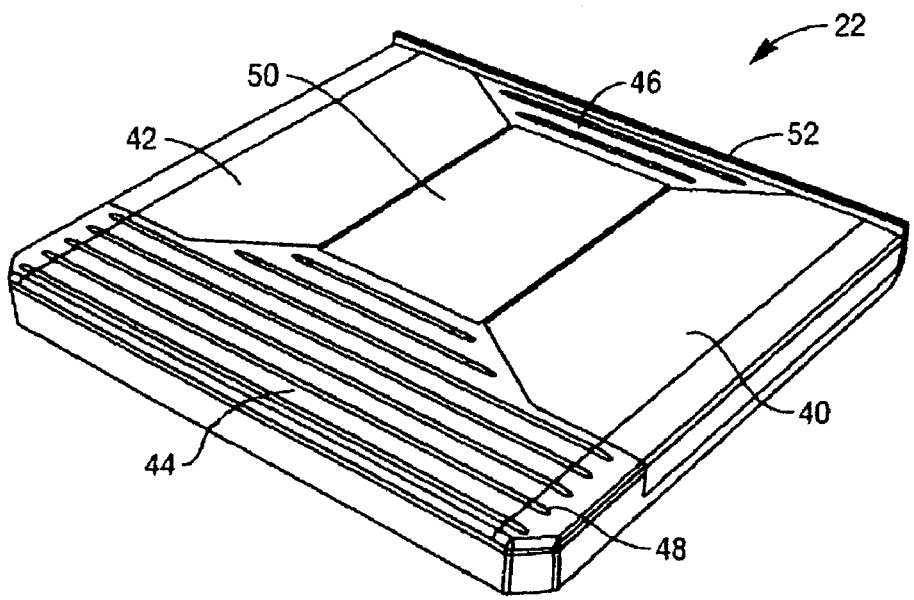
FIG. 2 is an example embodiment of a weigh plate.

With reference to FIG. 2, an example weigh plate 22 includes four generally planar sections 40-46 and window 50. In alternative embodiments, weigh plate 22 may include other numbers and combinations of sections. For example, weigh plate 22 may be configured in one section as all non-metallic. As another example, weigh plate 22 may be predominantly non-metallic but include one or two additional metal sections for rigidity and support. Weigh plate 22 may have more than four sections as well.

Sections 40 and 42 are located on opposite sides of window 52 along the path that item 30 would take across weigh plate 22 and under which EAS system 16 and/or RFID system 18 are most likely to be located. Sections 40 and 42 are made of a non-metallic but durable material, such as various grades of thermoplastic or thermoset plastics. These materials are sufficiently rigid and resistant to scratching and chemical degradation to make them suitable substitutes for metal. Sections 40 and 42 may be fabricated by molding thermoset components in liquid form and then curing them, for example, by applying heat. Plastics are also more transparent to electromagnetic energy than metals.

Sections 40 and 42 may be substantially transparent to all electromagnetic fields from EAS system 16 and RFID system 18, thus permitting designers of such systems to optimize the effectiveness of electromagnetic fields for their intended use and minimize safety concerns.

Materials other than plastics that are also resistant to scratching and chemical degradation and that are more transparent to electromagnetic fields than metal are also envisioned.

Sections 44 and 46 may include metal for rigidity and durability.

At customer request, sections 40-46, including fence 52, may be produced in different colors or color schemes, for customer brand promotion, for example.

Sections 44 and 46 may include channels 48 for directing spilled liquids. For example, channels 48 may be oriented from a leading side of item checkout device 10 to a trailing side of checkout device 10, relative to the path of items 30 during scanning.

Since weigh plate 22 uses less metal, it costs less than a traditional metal weigh plate 22.

From a top down perspective, weigh plate 22 is generally rectangular in shape. The shapes of sections 40-46 is a compromise between metallic and non-metallic preferences. As illustrated, sections 40-42 are defined by diagonal lines emanating from the corners of window 50. Other shapes are envisioned. For example, sections 40-42 may be rectangular and longer. As another example, sections 40-42 may be combined into a single U-shaped section.

Window 50 is substantially flush-mounted in weigh plate 22. Window 50 may be made of glass or other scratch resistant and transparent materials, including combinations of materials. For example, window 50 may be made of glass coated with sapphire for scratch resistance.

Weigh plate 22 is constructed and assembled in a way that permits substitution of non-metallic sections 40 and 42 if necessary.

Sections 40-46 and window 50 may be assembled with glue and supported at the joints by underlying metal fixtures.

Weigh plate 22 may include tapered edges to provide a transition to a surrounding checkout counter in which item checkout device 10 may be mounted.

Figure 3:
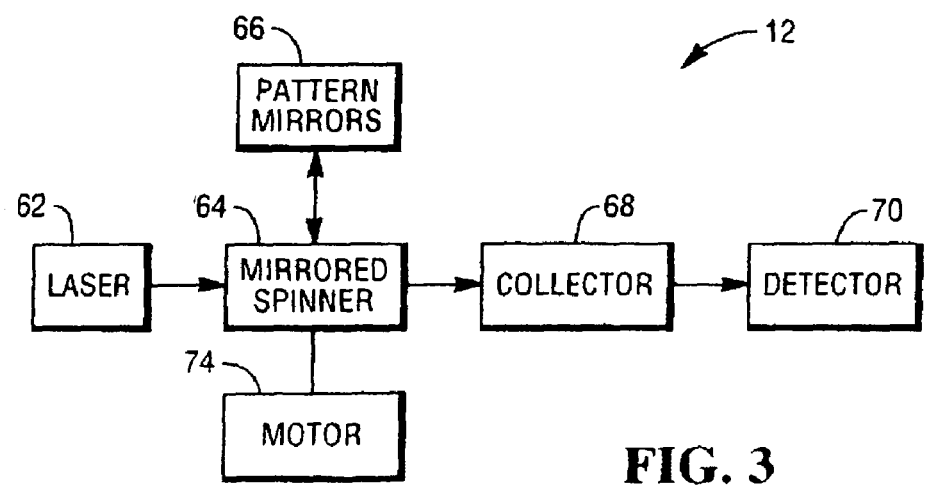
FIG. 3 is a block diagram of an example barcode reader.

With reference to FIG. 3, an example barcode reader 12 includes laser 62, mirrored spinner 64, pattern mirror 66, collector 68, and detector 70.

Laser 62 produces a laser beam.

Mirrored spinner 64 directs the laser beam to pattern mirrors 66 to produce a scan pattern, and receives reflected light from item 30 from pattern mirrors 66. Mirrored spinner 68 is rotated by motor 74.

Pattern mirrors 66 direct the laser beam through window 76 towards bar code label 32 and direct the reflected light to mirrored spinner 64.

Collector 68 collects the reflected light from mirrored spinner 64 and directs it towards detector 70.

Detector 70 converts the reflected light into electrical signals.

In an alternate example, barcode reader 12 may include two or more windows 76, and correspondingly may include a plurality of lasers 62, a plurality of mirrored spinners 64, a plurality of sets of pattern mirrors 66, a plurality of collectors 68, and a plurality of detectors 70 for scanning item 30 from a plurality of additional directions.

Figure 4:
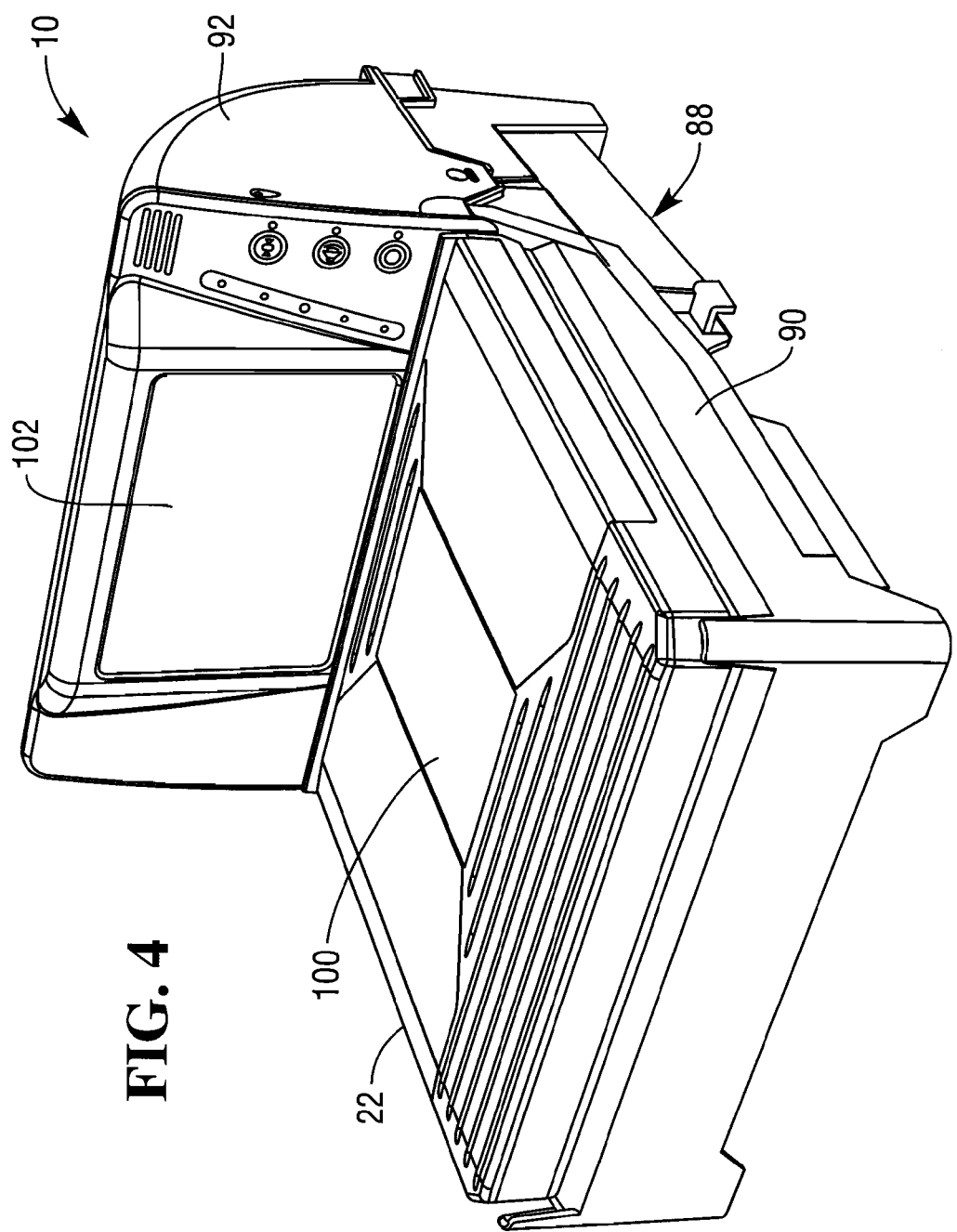
FIG. 4 is a perspective view of an example checkout device.
Figure 5:
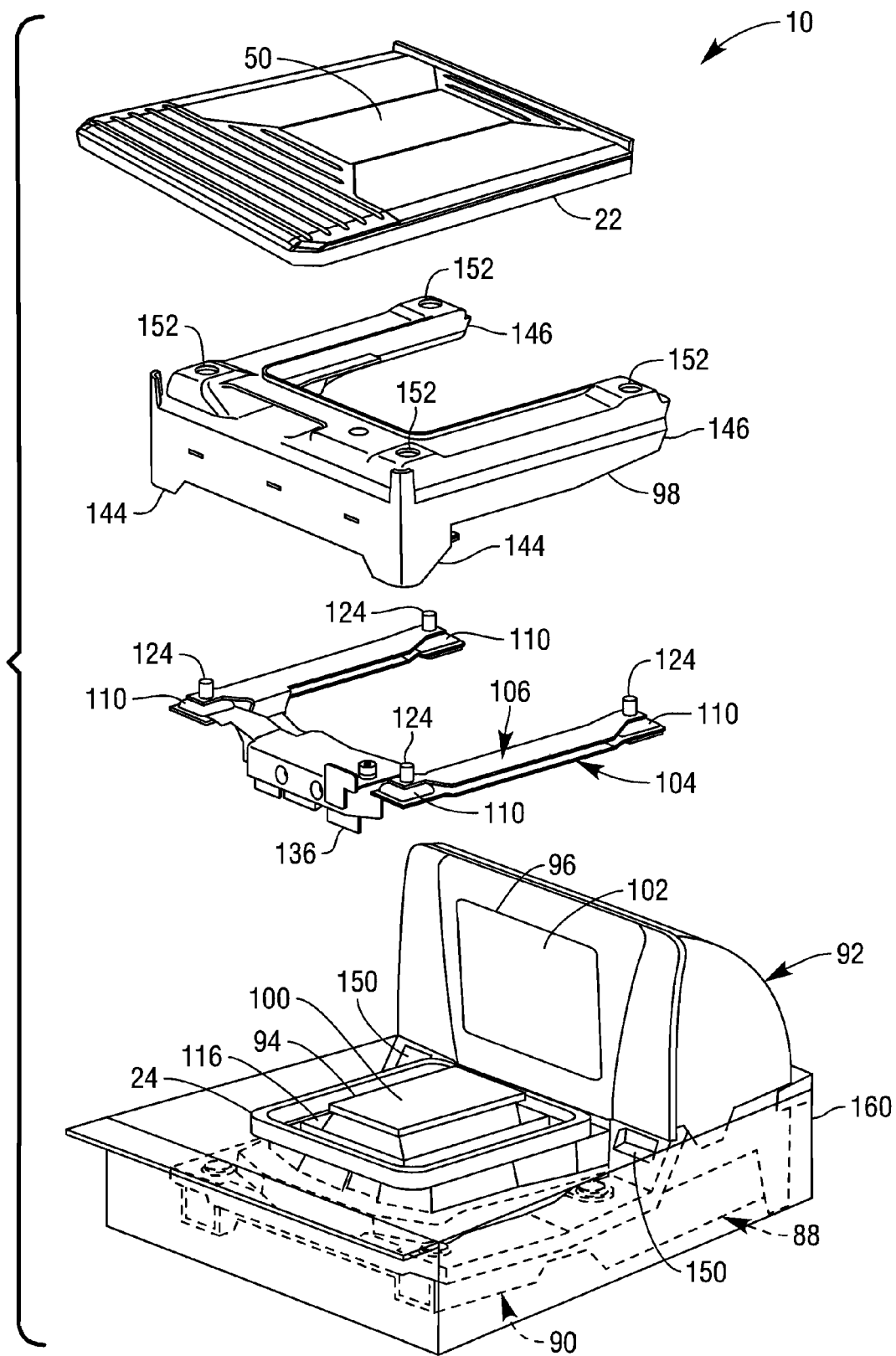
FIG. 5 is an exploded view of the example checkout device of FIG. 4.

With reference to FIGS. 4 and 5, an example embodiment of item checkout device 10 is illustrated in more detail. In this example embodiment, item checkout device 10 includes two windows 100 and 102.

Item checkout device 10 includes a housing 88 including a first housing portion 90 and a second housing portion 92. First housing portion 90 includes substantially horizontal aperture 94, including window 100 for scanning item 30 from a first set of directions. First housing portion 90 includes a first set of pattern mirrors 66.

Second housing portion 92 includes substantially vertical aperture 96, including window 102 for scanning item 30 from a second set of directions. Second housing portion 90 includes a second set of pattern mirrors 66.

First housing portion 90 includes top piece 98. Top piece 98 has a top surface and side surfaces to complete the upper part of first housing portion 90. Top piece 98 is generally U-shaped to fit around aperture 94 on at least three sides and is easily removable from first housing portion 90. For other item checkout devices, top piece 98 may surround aperture 94 on all four sides.

Scale assembly 14 is located within first housing portion 90. Scale assembly 14 is mounted to the bottom surface of top piece 98.

Scale assembly 14 includes load cell support member 104, load cell floating frame 106, and load cell electrical circuitry 108.

Load cell support member 104 provides a platform for mounting load cells 110 and load cell electrical circuitry 108. Load cell support member 104 is mounted to the bottom surface of top piece 98.

Weigh plate support posts 124 fasten to load cells 110. Besides supporting weigh plate 22, weigh plate support posts 124 couple load cell floating frame 106 to load cells 110. Weight plate support posts 124 protrude through apertures 152 in top piece 98.

Load cell support member 104 may be made of metal and may be generally U-shaped. Other support member configurations are also envisioned for other readers, including four support members around aperture 94.

Load cell support member 104 conveniently borders pattern mirror housing 116 in first housing portion 90 without obstructing scanning light beams from aperture 94 and without interfering with positioning of EAS coil 24 around pattern mirror housing 116. Since scale assembly components are located above pattern mirrors 66, pattern mirror housing 116 may be sealed.

Load cell floating frame 106 counteracts side loads and minimizes corresponding spreading of load cells 110. The illustrated example of load cell floating frame 106 is generally U-shaped and is made of metal. Other floating frame configurations are also envisioned for other readers, including four floating frames around aperture 94.

Electrical circuitry 108 includes connector 136 which couples to a corresponding connector in first housing portion 90.

At one end, top piece 98 may be supported by feet 144. Feet 144 and first housing portion 90 are supported by metal basket 160. At another end, top piece 98 includes latch ends 146 which rotatably couple to corresponding latch receptacles 150.

Weigh plate 22 rests upon load cell support posts 124.

Although particular reference has been made to certain embodiments, variations and modifications are also envisioned within the spirit and scope of the following claims.

What is claimed is:

1. A scale weigh plate for an item checkout device including an electromagnetic field generator and a barcode reader, wherein the scale weigh plate comprises:
   a non-metallic planar section made of plastic having a top surface resistant to damage and substantially transparent to electromagnetic fields generated by electronic article surveillance systems and radio frequency identification tag readers;

a section including metal for rigidity and durability, and coplanar with the non-metallic planar section; and
a window coplanar with the non-metallic planar section;
wherein when the weigh plate is installed within the item checkout device, the non-metallic planar section is located over the electromagnetic field generator and the window is located over the barcode reader.

2. The scale weigh plate of claim 1, wherein the at least one section including metal and coplanar with the non-metallic planar section and the non-metallic planar section are assembled with the window to form the weigh plate in a manner that permits substitution of the non-metallic planar section.

3. A scale weigh plate for an item checkout device including an electromagnetic field generator and a barcode reader, wherein the scale weigh plate comprises:
a first plastic planar section;
a second plastic planar section coplanar with the first plastic planar section;
a window coplanar with and located between the first and second plastic planar sections;
a first metallic planar section located adjacent to and coplanar with first sides of the first and second plastic planar sections and the window; and
a second metallic planar section located adjacent to and coplanar with second sides of the first and second plastic planar sections and the window;
wherein when the weigh plate is installed within the item checkout device, the first and second plastic planar sections are located over the electromagnetic field generator and the window is located over the barcode reader, and the first and second metallic planar sections provide rigidity and durability.

4. The scale weigh plate of claim 3, wherein the first and second plastic planar sections and the window are along a scan path of the item checkout device.

5. The scale weigh plate of claim 3, wherein the first metallic planar section is located on an operator side of the item checkout device and the second metallic planar section is located on a side of the item checkout device opposite the operator side.

6. An item checkout device comprising:
a housing;
an electromagnetic field generator in the housing;
a barcode reader in the housing;
a scale assembly in the housing; and
a weigh plate supported by the scale assembly and including a non-metallic planar section made of plastic and located over the electromagnetic field generator and having a top surface resistant to damage and substantially transparent to electromagnetic fields generated by electronic article surveillance systems and radio frequency identification tag readers assembled with a coplanar section including metal for rigidity and durability, and a window coplanar with the non-metallic planar section and located over the barcode reader.

7. The item checkout device of claim 6, wherein the electromagnetic field generator comprises an electronic article surveillance system.

8. The item checkout device of claim 6, wherein the electromagnetic field generator comprises a radio frequency identification tag reader.

9. An item checkout device comprising:
a housing;
an electromagnetic field generator in the housing a barcode reader in the housing;
a scale assembly in the housing; and
a weigh plate supported by the scale assembly and including
a first plastic planar section;
a second plastic planar section coplanar with the first non-metallic planar section;
wherein the first and second plastic planar sections are located over the electromagnetic field generator;
a window coplanar with and located between the first and second plastic planar sections and located over the barcode reader;
a first metallic planar section located on an operator side of the item checkout device and adjacent to and coplanar with first sides of the first and second plastic planar sections and the window; and
a second metallic planar section located adjacent to and coplanar with second sides of the first and second plastic planar sections and the window.

10. The item checkout device of claim 9, wherein the electromagnetic field generator comprises an electronic article surveillance system.

11. The item checkout device of claim 9, wherein the electromagnetic field generator comprises a radio frequency identification tag reader.

12. The scale weigh plate of claim 1 wherein the non-metallic planar section is a thermoplastic or thermoset plastic.

13. The scale weigh plate of claim 1 wherein the non-metallic planar section is formed by molding thermoset components in liquid form and then curing.

14. The scale weigh plate of claim 1 further comprising a second coplanar section including metal for rigidity and durability and a second coplanar non-metallic section.

15. The scale weigh plate of claim 14 wherein the weigh plate is constructed and assembled in a way that permits substitution of another non-metallic planar section if necessary.

16. The scale weigh plate of claim 1, wherein the non-metallic planar section further comprises channels for directing spilled liquids.

17. The scale weigh plate of claim 16, wherein the channels are oriented from a leading side of a checkout device to a trailing side of the checkout device relative to a normal path of items during scanning when the weigh plate is installed within the item checkout device.

18. The scale weigh plate of claim 3 wherein the first and second planar sections are substantially transparent to electromagnetic fields generated by electronic article surveillance systems and radio frequency identification tag readers.

19. The scale weigh plate of claim 9 wherein the first and second planar sections are substantially transparent to electromagnetic fields generated by electronic article surveillance systems and radio frequency identification tag readers.

* * * * *